Patented Oct. 6, 1931

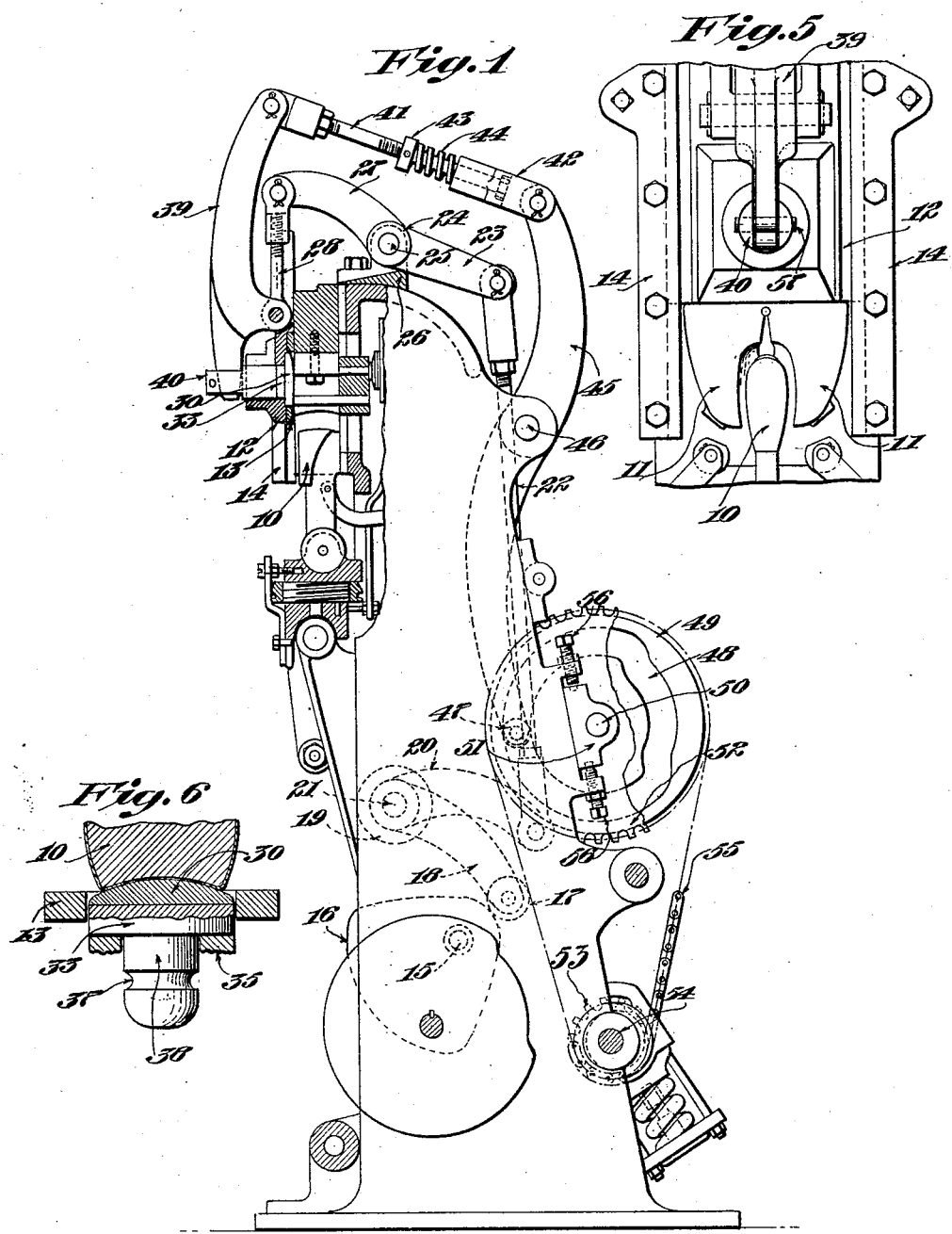

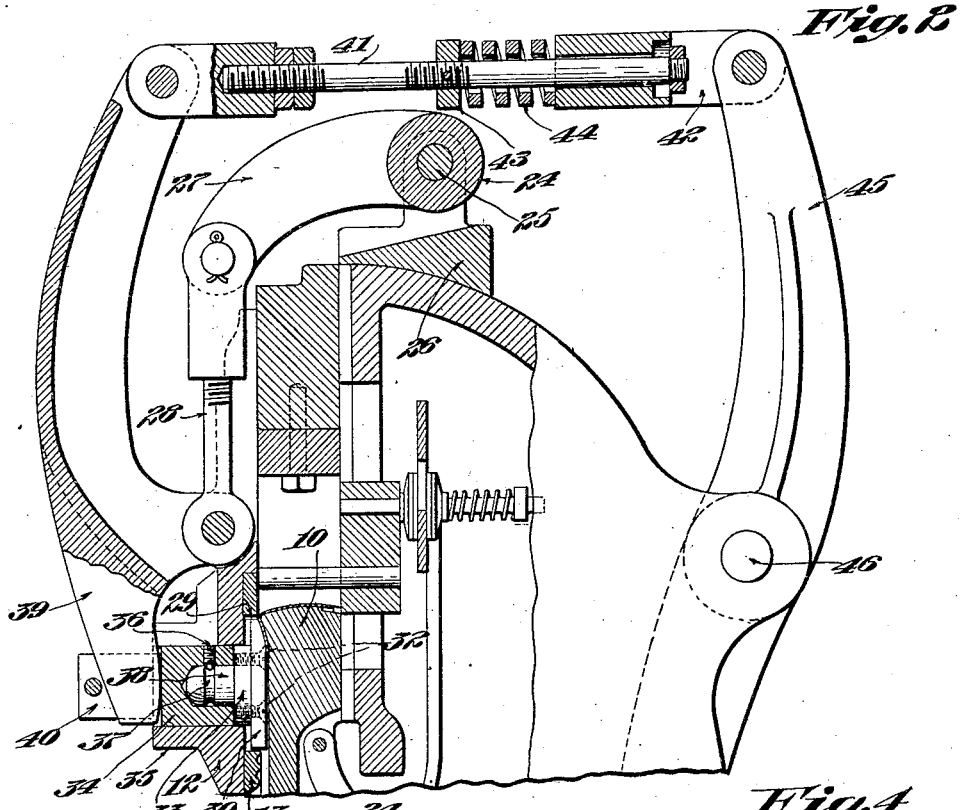
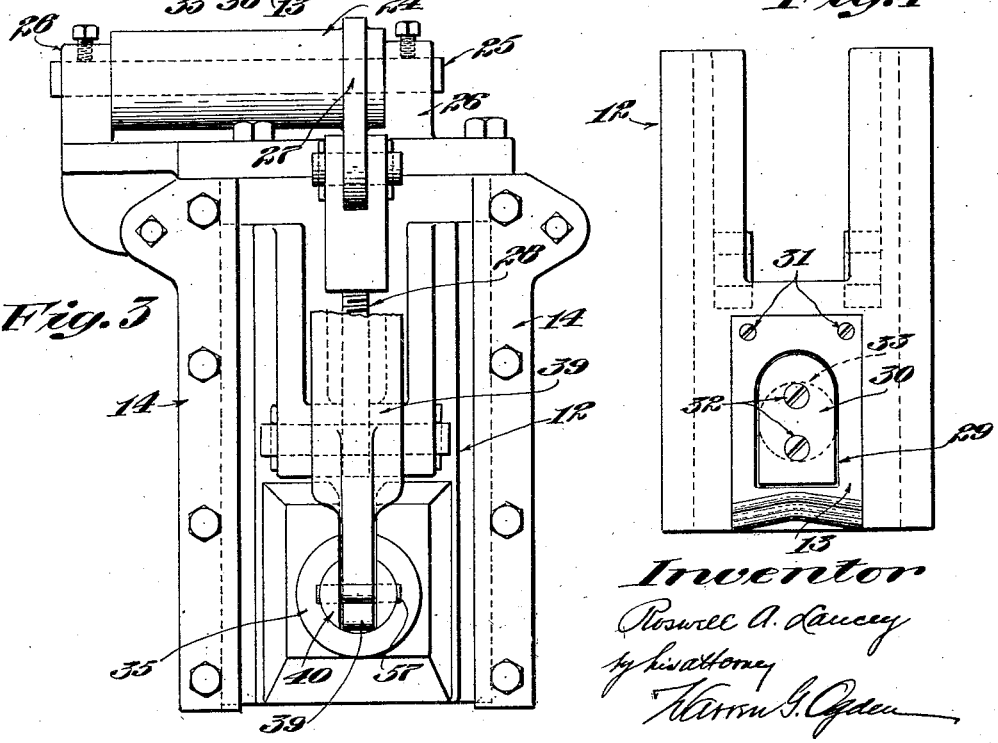

1,825,964

UNITED STATES PATENT OFFICE

ROSWELL A. LANCEY, OF TOWNSEND, MASSACHUSETTS, ASSIGNOR TO SPAULDING FIBRE COMPANY, INC., OF NORTH ROCHESTER, NEW HAMPSHIRE, A CORPORATION OF NEW HAMPSHIRE

COUNTER MOLDING MACHINE

Application filed March 23, 1928. Serial No. 264,124.

This invention relates to machines for molding counters for boots and shoes, and more particularly to an improved pressure mechanism for molding the heel-seat flange of the counter.

The main objective in preparing molded counters is to produce a counter which will fit the last with which it is to be assembled thus retaining the lines of the last in the shoe, which means perfection in shoe making, and eliminating all possibility of a less accurate fitting through forced manipulation by the operator. It has heretofore been the practice to mold the heel-seat flange of the counter merely to the degree required to cause the flange to engage the heel-seat of the last but, owing to the tendency of the flange to spring back from the position to which it is molded, when such a counter is fitted on the last its heel-seat flange does not engage but, actually, is sprung away from the heel-seat of the last.

In the type of counter molding machine disclosed in Letters Patent of the United States, No. 1,138,123, granted to me May 4, 1915 (hereinafter referred to as the Lancey patent) tempered counter blanks are molded under heat and pressure. This combination of temper, heat and pressure produces an improved molded counter because the spring-back of the molded heel-seat flange from its molded position is reduced in extent and rendered more uniform. But any appreciable spring-back of the heel-seat flange of a counter is sufficient to make fine shoe making difficult by preventing a proper fitting of the counter to the last. In order to produce a machine for molding counters having heel-seat flanges which will snugly fit the last when assembled thereon within the upper materials it has been proposed to mold the flange of the counter to the desired degree plus an increment commensurate with the spring-back which occurs after molding. To achieve this two important changes were made in the construction and mode of operation of counter molding machines such as disclosed in the said Lancey patent. First, the forward face of the center mold was recessed to form a concavity so proportioned as to permit giving the flange portion of the counter an additional molding increment the amount of which is at least equal to the amount the molded flange springs away from molded position after withdrawal from the molds. Second, the wiper plate, which reciprocates across the forward face of the center mold to form and crimp a heel-seat flange on the counter, was provided with an auxiliary plug wiper which, in addition to wiping the flange in the direction of the stroke of the wiper plate was actuated also in a direction substantially normal to the direction of said wiping stroke to exert a direct pressure upon the flange. The flange being bent and crimped by the wiping plate was simultaneously being pressed into engagement with the inwardly sloping margin of the concaved face of the center mold. Because the auxiliary plug wiper partook of the wiping stroke of the wiper plate, it proved impracticable, for reasons understood by those skilled in the art, to exert as heavy a pressure on it as is desirable for the finest work.

The principal object of the present invention is to produce a counter molding machine of the improved type just described, capable of exerting sufficient pressure on the flange from an auxiliary pressure member or plug to effect the desired additional molding and to press the crimped flange into the concaved face of the center mold in a reliable and certain manner.

To the accomplishment of this object and such others as may hereinafter appear, the various features of the present invention consist in certain devices, combinations and arrangements of parts fully set forth hereinafter, the advantages of which will be readily understood by those skilled in the art.

The various features of the present invention will be explained in connection with the accompanying drawings illustrating the best form of the invention at present devised, in which, Figure 1 is a view, in elevation, partly in section, of a portion of the counter molding machine disclosed in the Lancey patent having the present improvements incorporated therein;

Fig. 2 is a view, in sectional elevation, of the upper portion of the counter molding machine shown in Fig. 1, showing the counter in position between the closed molds;

Fig. 3 is a view, in front elevation, showing the reciprocating carrier, which supports the wiper plate and the pressure plug, in the position illustrated by Fig. 2;

Fig. 4 is a view, in rear elevation, of the reciprocating carrier;

Fig. 5 is a view, in front elevation, showing the reciprocating carrier in the position illustrated by Fig. 2 with the side molds open; and Fig. 6 is a fragmentary view, in sectional plan, showing the concave and convex surfaces on the opposed faces of the center mold and pressure plug, respectively.

In the embodiment of the invention illustrated in the drawings, the center mold 10, the side molds 11, the wiper carrier 12, and the wiper blade or plate 13 are actuated successively by the mechanisms described in said Lancey patent to mold the counter portion of the counter and then to wipe its projecting flange portion toward the forward face of the center mold. The molds may be, and preferably are, heated.

As set forth in said Lancey patent, the wiper carrier 12 reciprocates beneath guide plates 14 which, in the present machine, have been lengthened and strengthened to resist the heavy transverse strains to which said carrier is now subjected. The wiper carrier 12 is raised and lowered, or reciprocated, by two complemental cams mounted on the wiper cam shaft 15 (Fig. 1), but for the purposes of disclosing the present invention it is only necessary to illustrate and describe the cam 16 by which the wiper plate 13 is lowered to bend and crimp the flange about the peripheral edge of the forward face of the center mold. The peripheral edge of the forward face of the cam 16 is engaged by a roll 17 journaled on one end of an arm 18 on the hub 19 of a lever 20. The hub 19 is pivotally mounted on a pin 21 fixed to a stationary part of the machine. The lever 20 is connected by a link 22 to the rear arm 23 of a wiper carrier operating lever having a hub 24 (Figs. 1 and 2) mounted on a shaft 25 supported in brackets 26 secured at the top of the machine frame. The hub 24 has a forward arm 27 which is pivotally connected by an adjustable link 28 to the wiper carrier 12.

In order that the extent to which the flange portion of the counter is molded may be increased to eventually produce a counter having a molded heel-seat flange that will hug the heel-seat of the last, the forward face of the center mold 10 is relieved by a concavity best shown by Figs. 2 and 6. This concavity is shaped to receive the flange portion of the counter against its margin. The dimensions of the concavity are such as to provide for imparting to the flange portion of the counter a molding increment the amount of which is at least equal to the amount the molded flange springs away from molded position after withdrawal from the molds. The degree of this molding increment is known within effective limits owing to the perfection of the process heretofore attained.

In order to press the flange portion of the counter into engagement with the recessed face of the center mold, the wiper plate 13 is herein provided with a rectangular opening 29 (Fig. 4). Mounted to operate within this opening is a pressure plug 30 (Figs. 2 and 6) which has a surface convexed across the path of reciprocation of the carrier 12 to conform to the transverse curvature of the forward face of the center mold 10. As shown in the drawings the flange engaging surface of the pressure plug 30 is shaped to mold the flange into engagement with the inwardly sloping margin of the concaved face of the center mold.

The wiper plate 13 is secured by screws 31 (Fig. 4) to the wiper carrier 12. The plug 30 is secured by screws 32 to a cylindrical thrust-block 33 (Figs. 2 and 6) which engages the rear end face of a cylindrical hollow plunger 34 mounted to slide within a housing 35 formed in the wiper carrier 12. The thrust-block 33 is held in position against the plunger 34 by one or more screws 36 which enter a peripheral groove 37 formed on a cylindrical stem 38 projecting from the thrust-block 33 into the hollow plunger 34. The hollow plunger 34 is held from rotating relative to the carrier 12 by the lower arm of a lever 39 which is embraced by the walls of a slot 40 (Figs. 2 and 3) formed in the forward end of the plunger 34. The lever 39 is yoked to embrace the pivotal connection between the wiper carrier 12 and the adjustable link 28.

While inactive the plug 30 occupies the position of Fig. 1. After the center and side molds have been actuated to mold the counter portion of the counter, the carrier 12 is lowered from the position of Fig. 1 to the position of Fig. 2 in order to cause the leading edge of the wiper plate 13 to engage and crimp the flange portion of the counter about the forward peripheral edge of the center mold. During this movement of the wiper plate 13 the lever 39 holds the plug 30 retracted within the wiper plate opening 29.

In order that the plug 30 may be projected out of the opening 29, from the position of Fig. 1 to that of Fig. 2, after the downward movement of the carrier 12 has ceased and thus mold the flange already formed by the wiper plate 13 into engagement with the sloping marginal face of the center mold, the upper arm of the lever 39 is adjustably connected to one end of a rod 41 the other end of which is loosely carried by a link 42 (see Fig. 2). Coiled about the rod 41 and interposed between the link 42 and an adjustable collar 43 on the rod is a heavy spring 44. The link 42 is pivotally connected at its rear end to the upper end of a lever 45 pivoted centrally, at 46, at the rear of the machine frame.

The lower end of the lever 45 carries a cam roll 47 (Fig. 1) engaged in a cam groove 48 formed in one face of a cam disk 49 secured to an auxiliary cam shaft 50, journaled in a pair of adjustable bearing brackets 51. The shaft 50 is provided with a large sprocket 52 which is driven from a smaller sprocket 53 on the eccentric shaft 54 by a chain 55 passed over the sprockets. The vertical position of the bearings 51 may be changed to adjust the tension of the chain 55 by set screws 56 as shown in Fig. 1.

While the wiper carrier 12 is in motion the spring 44 is held in an uncompressed condition with the plug 30 housed in the wiper plate opening 29 (see Fig. 1). The spring 44 is compressed by the cam groove 48 at the end of the bending and crimping stroke of the wiper plate to exert a heavy pressure on the inturned flange in a direction normal to the face of the center mold or path of movement of the wiper plate, and thus mold the flange firmly into engagement with the sloping margin of the face of the center mold. With this construction and mode of operation, the flange is subjected to a heavy pressure without the slightest tendency of the counter being displaced from its position between the molds.

The cam 16 is designed, complementally to the other cam on the shaft 15 by which the wiper carrier 12 is elevated into the position of Fig. 1, so as to maintain the roll 17 on its periphery during the elevation of the wiper carrier. The roll 17 then enters a dwell and the wipper carrier 12 is thus held stationary until the center mold and the side molds have been actuated to mold the counter portion of the counter. After this operation has been completed the cam 16 lowers the wiper carrier to cause the wiper plate to bend and crimp the marginal portion of the counter about the peripheral edge of the forward face of the center mold toward the recessed face thereof. After this operation is completed the roll 17 enters another dwell in the cam 16 and the wiper carrier 12 is thus held in the position of Fig. 2 while the plug 30 is actuated to impart the final direct molding pressure to the crimped and bent flange.

The cam groove 48 is provided with a 240° dwell in such an angular position relative to the dwells of the wiper plate cams that the lever 45 is held in the position shown in Fig. 1 during both the up and down stroke of the wiper plate carrier and the molding operation of the side molds. While the pressure plug 30 is carried by the wiper carrier 12 as it reciprocates the plug 30 remains housed within the opening 29 in the wiper plate 13 during said reciprocation, the link 42 pivoting on its rear end connection with the then stationary lever 45. After the wiper plate 13 has completed its downward flange-bending and crimping stroke the cam groove 48 actuates the lever 45 in a direction to move the rod 41 forward which transmits its pressure to the lever 39 to force the plunger 34 inward and project the plug 30 from its housing into engagement with the inturned flange. The throw of the cam groove 48 is sufficient to compress the heavy spring 44 (see Fig. 2). The cam groove 48 then holds the plug 30 for an interval thus holding the flange, under pressure from the spring 44, in the recessed face of the center mold. Thereafter the lever 45 is actuated in the opposite direction first to release the pressure on the plug 30 exerted by the spring 44, and then to withdraw the plunger 34 to reseat the plug in its housing. The lower end of the lever 39 is moved at this time in a direction to cause it to engage a pin 57 bridging the slot 40 in the outer end of the plunger 34 and thus withdraw the plug 30 from its position of pressure within the recessed face of the center mold. The wiper carrier 12 is then raised to the position of Fig. 1 by the cam on the shaft 15 formed complementally to the cam 16.

As a result of the operations described the molding machine delivers a counter having the wiped and molded portions of its heel-seat flange, at both sides and at the heel end, all lying in the same plane because the spring-back of the flange after the excessive molding given to it is not sufficient to move it beyond this desired position. A uniform product, having its molded counter portion and its molded flange portion so positioned and related to each other that a perfect fit on the heel end of the last is obtained, is thus produced with complete elimination of poor shoe making because of a bulging counter. Whether the entire flange is to lie in a single plane or not is determined by adjustment of the actuating mechanism of the wiper carrier 12, whereby the extent of travel of the wiper 13 may be altered to vary the lower limit thereof. This adjustment is made in accordance with the demands of manufacturers. But whether or not the machine disclosed in the drawings is adjusted to produce a molded counter having a part only of its flange molded by the wiper plate, the entire area of the portion of the flange to be molded is engaged by the flange-engaging surface of the pressure plug at each inward movement thereof.

It will be noted that the mounting of the plug 30 in the hollow plunger 34 provides for an automatic adjustment of the plug surface to the concaved surface of the center-mold. Care must be taken that excessive pressure is not applied to the edge of the mold, where the counter material is bent about it, since such pressure may crack or cut through the counter. The slight looseness of fit of the plug in the opening 29 (see Fig. 4) permits some angular movement if necessary to accurately seat the plug. To this end also the stem 38 is fitted within the hollow plunger 34 in a manner to permit a slight rocking of the plug on seating within the recessed face of the center mold. The plug is thus enabled to slip into perfect centralized pressure position against the inturned flange under all conditions of use.

It will be clear to those skilled in this class of machines and with the general objects of the present invention in view, that changes may be made in the details of structure, the described and illustrated embodiment of the invention being intended as an exploitation of its underlying essentials, the features whereof are definitely stated in their true scope in the claims herewith.

That which is claimed as new, is:—

1. A counter molding machine having, in combination, a center mold having a recessed face and side molds relatively movable to mold the counter portion of a counter, wiping means for turning the heel-seat flange of the counter towards the recessed face of the center mold and for then holding said flange in its inturned position, and means in addition to the wiping means for pressing all portions of the surface of the flange to be molded simultaneously into engagement with said recessed face.

2. A counter molding machine having, in combination, a center mold having a concaved face and side molds relatively movable to mold the counter portion of a counter, means movable across the center mold for wiping the heel-seat flange of the counter towards the concaved face of the center mold, a pressure device movable with said wiping means having a surface adapted to engage the flange from end to end, and means for applying pressure through said device with unity of time to the entire area of the flange which is to be molded and forcing it into engagement with the inwardly sloping margin of the concaved surface of the center mold.

3. A counter molding machine having, in combination, a center mold and side molds relatively movable to mold the counter portion of a counter, a wiper plate movable across the forward face of the center mold for wiping the heel-seat flange of the counter towards the forward face of the center mold, a pressure device supported by said wiper plate having a flange-engaging surface, and mechanism actuated after completion of the wiper movement for operating said device to cause said surface to mold the completely wiped flange substantially throughout its area by direct pressure in a direction normal to the plane of the path of travel of said wiper plate.

4. A counter molding machine having, in combination, means for supporting a counter, and three independently operated mechanisms successively completing their functions in sequence for molding the counter portion thereof, for bending the marginal portion thereof to form a flange thereon, and for molding said flange to the desired degree plus an increment commensurate with the spring-back of the flange.

5. A counter molding machine having, in combination, means for supporting a counter, means including a cam for bending the marginal portion of a counter to form a flange thereon, means including a cam for molding said flange to a predetermined degree, and means for correlating the operation of said cams to render the bending means inactive during the operation of the molding means and to hold the molding means in a position of pressure for an interval during said inaction.

6. A counter molding machine having, in combination, means for supporting a counter in a fixed position including a center mold, and a device movable relatively to said center mold for crimping and pressing the flange portion of the counter against the face of the center mold, said device having a plurality of elements mounted to approach, engage and complete their operations on the flange portion of the supported counter from different directions successively.

7. A counter molding machine having, in combination, means for supporting a counter including a center mold, and a combined wiper and presser, portions of which are relatively movable in turn into engagement with the entire area of the flange portion of the counter to be molded for crimping and pressing said flange portion into molded position against the forward face of the center mold.

8. In a counter molding machine a reciprocatory wiper for preliminarily defining the heel-seat flange of the counter comprising a flange-turning plate provided with an auxiliary final flange-forming member mounted to move through said plate to engage and form the flange, and independent actuating means for said wiper and its auxiliary member operating alternately for reciprocating the wiper and operating the auxiliary member.

9. In a counter molding machine means for supporting a counter, a combined reciprocatory wiper for crimping and bending a heel-seat flange on the counter and auxiliary presser, and means independent of the moving wiper for moving said presser in a direction normal to the reciprocatory movement of the wiper and subjecting the crimped and bent flange portion of the counter to a heavy molding pressure against said support.

10. A counter molding machine having, in combination, means for supporting a counter including a center mold, a wiper movable across the forward face of said center mold for flanging the marginal portion of the counter, means for reciprocating the wiper, and means operating upon the completion of the wiping stroke of the wiper to exert pressure on the flange in a direction substantially normal to the plane of the path of travel of said wiper.

11. A counter molding machine having, in combination, a center mold having a recessed face and side molds relatively movable to mold the counter portion of a counter, and means for crimping and bending the flange portion of the counter inward about the peripheral edge of the center mold comprising a wiper plate provided with an opening and a pressure plug having a convexed surface complemental to that of the recessed face of the center mold mounted within the opening in a manner to centralize itself in pressure position within said recess.

12. A counter molding machine having, in combination, a center mold having a recessed face and side molds relatively movable to mold the counter portion of a counter, and means for crimping and bending the flange portion of the counter inward about the peripheral edge of the center mold comprising a wiper plate provided with an opening and a pressure plug mounted to rotate axially and rock laterally within the opening.

13. A counter molding machine having, in combination, a center mold having a recessed face and side molds relatively movable to mold the counter portion of a counter, a carrier movable past said molds, means for crimping and bending the flange portion of the counter about the peripheral edge of the center mold comprising a wiper plate mounted on the carrier and provided with an opening, a plunger mounted on the carrier, a plug carried by the plunger and received within the opening in the plate, mechanism for reciprocating the carrier and for holding the carrier stationary upon the completion of the wiper stroke, and means for actuating the plunger while the carrier is held stationary to advance the plug out of said opening and into the recess in the center mold.

14. In a counter molding machine means for supporting a counter including a center mold having a recessed face, a wiper plate movable across the recessed face of said center mold, an auxiliary presser carried by said wiper plate and movable in a direction to carry it into the recess of said center mold, means for holding said presser from movement during the entire travel of said wiper plate, and means for exerting pressure on said presser at the limit of travel of said wiper plate.

15. In a counter molding machine a carrier, a wiper plate for forming a heel-seat flange mounted on the carrier and provided with an opening, a hollow plunger mounted in the carrier at said opening, a thrust-block engaged with the inner end of the plunger, a stem projecting from the thrust-block rotatably mounted within the plunger, and a flange-engaging plug secured to the thrust-block within the opening in the wiper plate.

ROSWELL A. LANCEY.